Patented Jan. 16, 1934

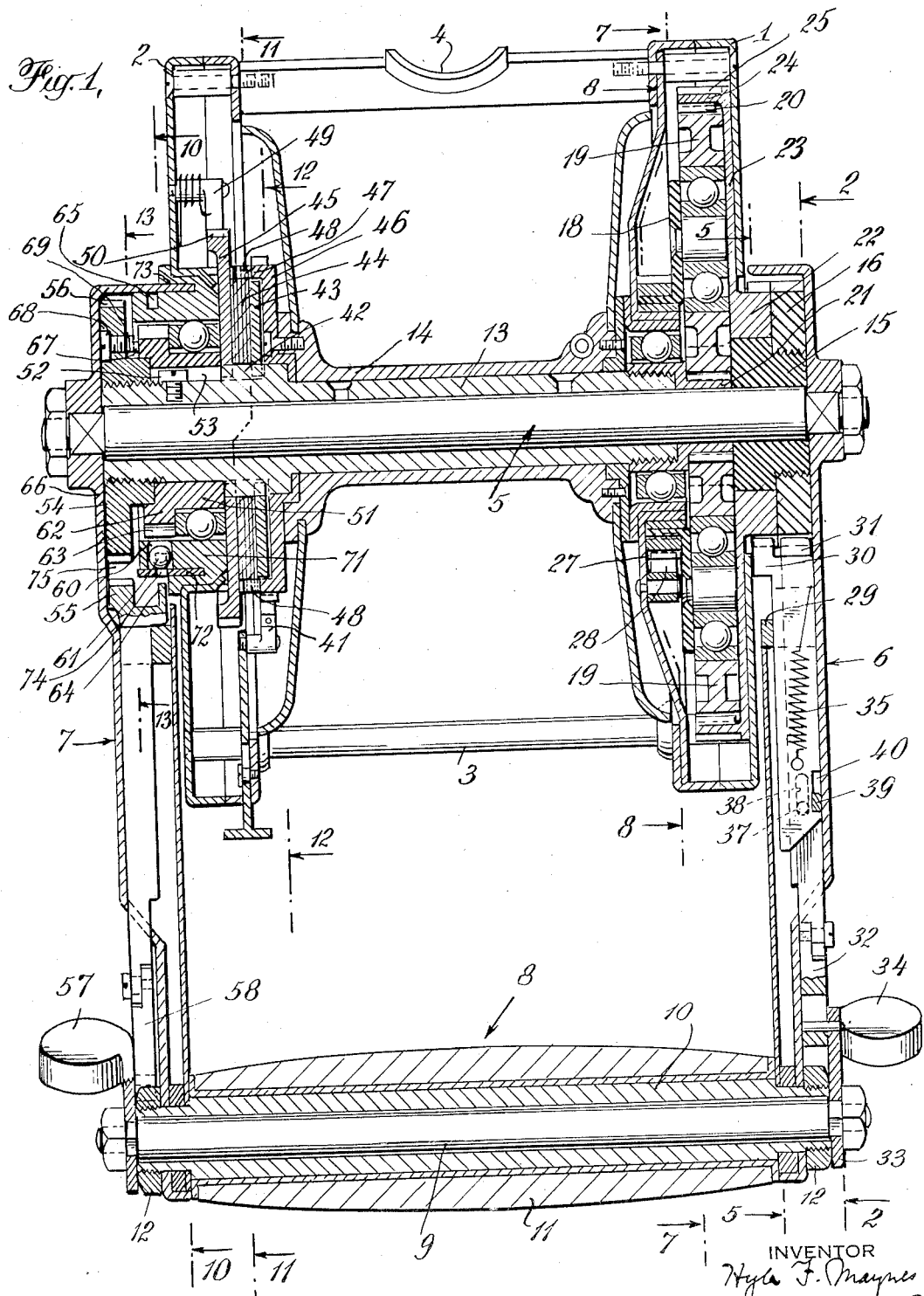
Jan. 16, 1934.　　H. F. MAYNES　　1,943,981
FISHING REEL
Filed March 13, 1933　　4 Sheets-Sheet 1

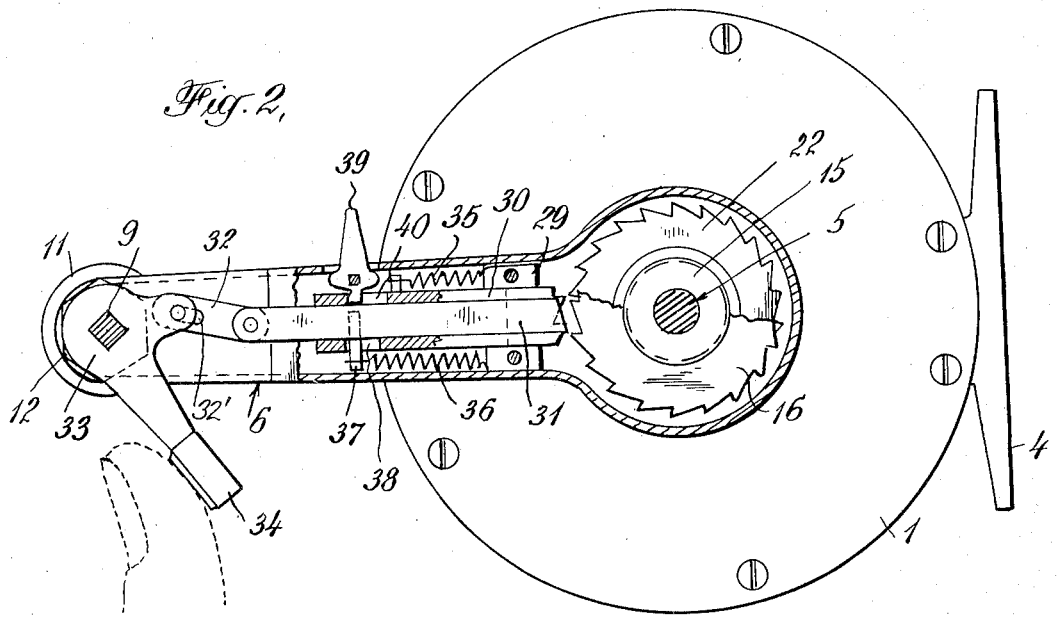
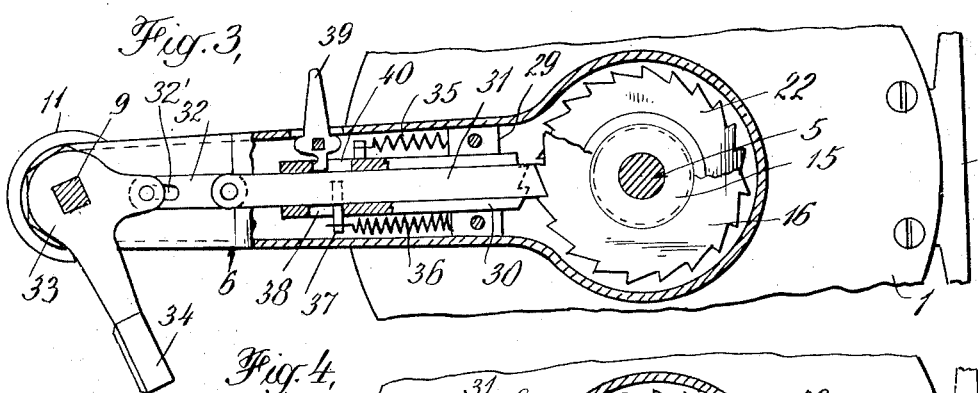
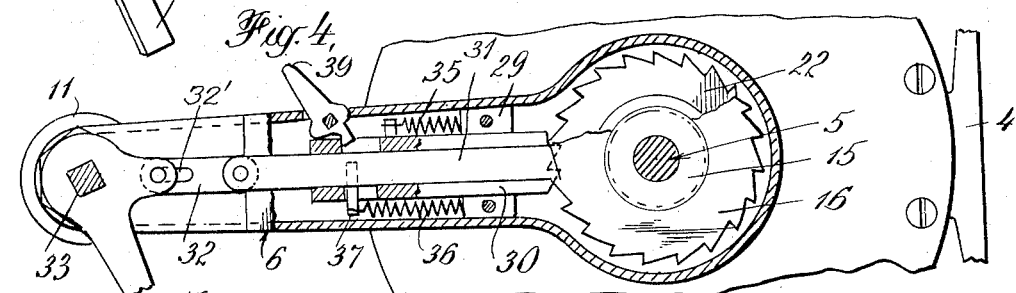
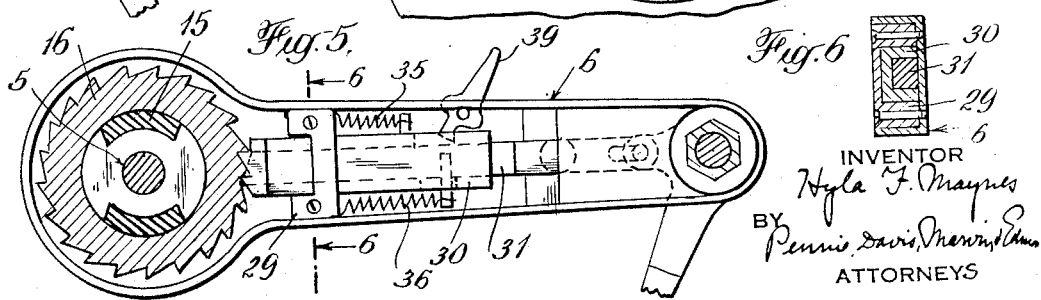

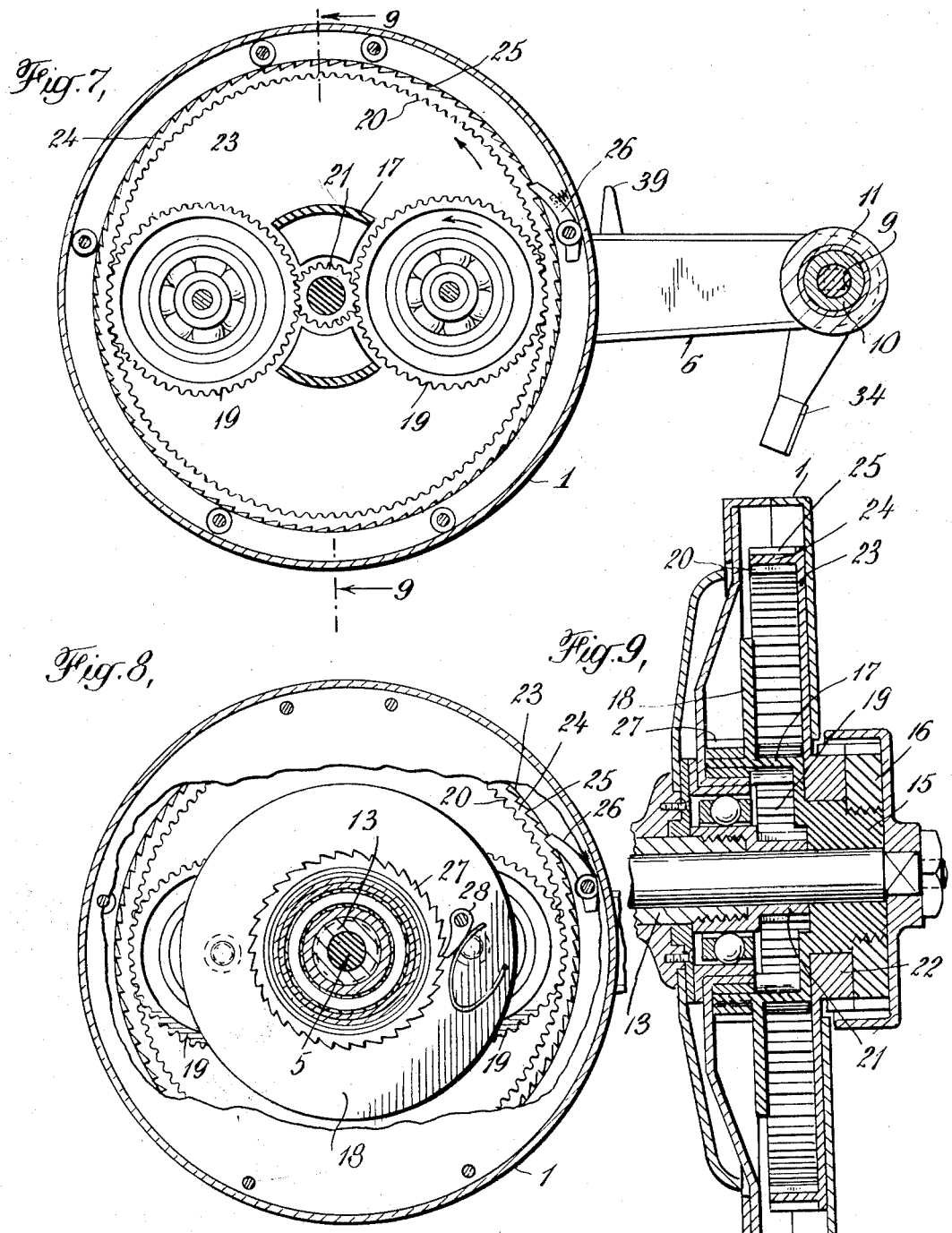

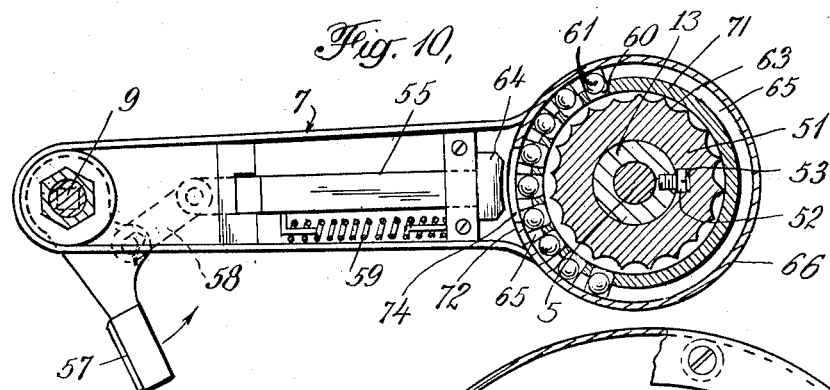
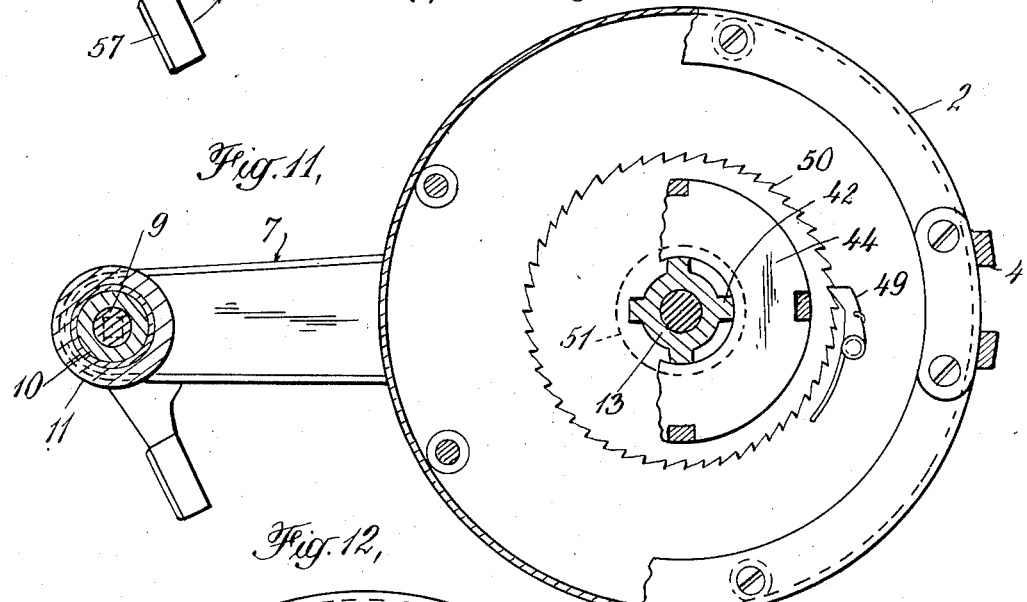
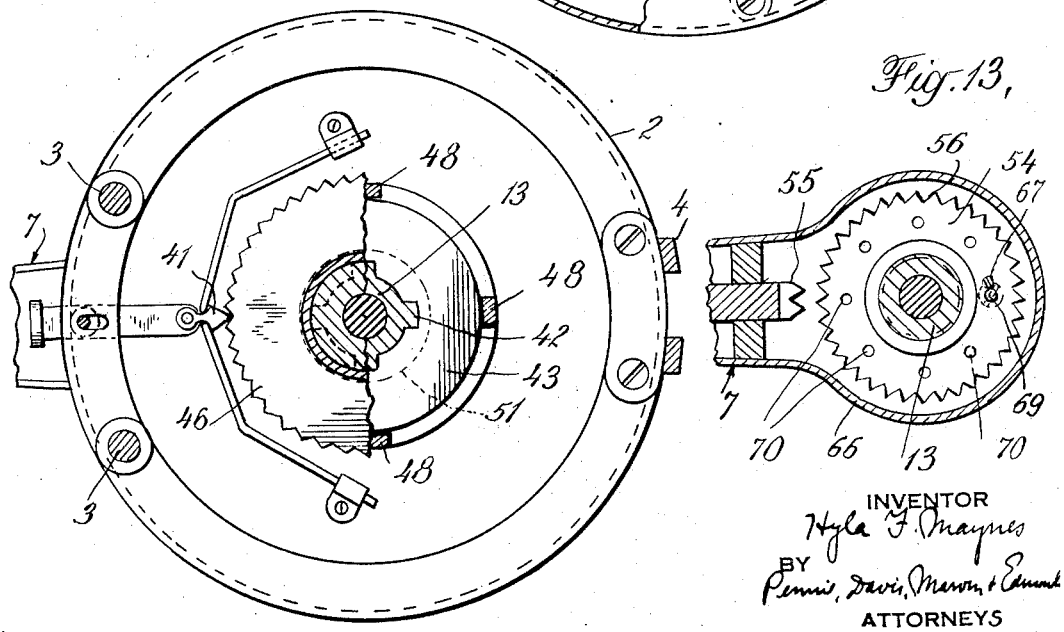
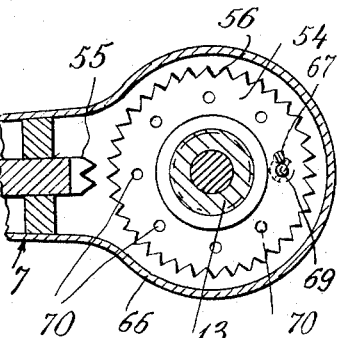

1,943,981

UNITED STATES PATENT OFFICE 1,943,981

FISHING REEL

Hyla F. Maynes, North Tonawanda, N. Y., assignor of one-half to Emma C. Maynes, North Tonawanda, N. Y.

Application March 13, 1933. Serial No. 660,494

11 Claims. (Cl. 242—84.5)

This invention relates to fishing reels particularly those reels used in deep sea fishing for large fish, and has for its object generally to improve upon reels of this type. It is the more specific object of the present invention to improve upon the deep sea fishing reel illustrated and described in my copending application, Serial No. 612,467, now Patent No. 1,905,483.

The reel of that earlier application of mine is provided with a swinging crank handle for rotating the spool in reeling-in, the handle being symmetrically located with respect to the pole thus avoiding twisting during reeling in. Another advantage of this type of handle is that it can be grasped by either fist, thus enabling the fisherman to use both hands effectively in supporting the pole and also enabling him to change hands without awkwardness should the pole arm become fatigued. In reeling the line in, the handle is oscillated and rotation of the spool effected by means of a ratchet. This ratchet is so arranged that the inward or pull stroke of the handle is the operating stroke, the outward or push stroke being an idling stroke. In accordance with the present invention I have provided a double-acting ratchet mechanism so that when desired both pull and push strokes of the handle operate to rotate the spool unidirectionally.

This greatly speeds up the reeling-in operation under no load conditions and is an improvement over my earlier form of reel. I have, however, provided means for rendering half of the ratchet mechanism inoperative so that the spool is rotated on one stroke of the handle only.

The reel described in my copending application is provided with a clutch for clutching the spool to a sleeve which is rotated by the oscillating handle. This clutch also acts as a drag permitting the fish to run the line out even during reeling-in. In my earlier reel I have provided means operable from the crank handle for varying the pressure between the clutch elements and so the line pull at which the spool will slip. This means comprises a nut mounted upon the spool sleeve acting through a series of pins to exert pressure upon the clutch discs. I also employ a collar for locking the spool sleeve to the rigid frame of the reel while this nut is being turned. In accordance with the present invention I have made improvements in the means for transmitting the pressure of the nut to the clutch discs and also in the means for locking the sleeve to the frame or end plate of the reel during the time that the nut is being turned.

I have, in addition, improved the form of the cranks and the operating mechanism directly connected to the transverse handle, and generally made a better reel.

In the accompanying drawings I have illustrated a preferred embodiment of my invention. In these drawings Figure 1 is a transverse section through the reel and its operating crank handle; Figure 2 is a section taken along line 2—2 of Figure 1, illustrating the operating ratchets, both pull and push pawls being disengaged from their ratchets; Fig. 3 is a view similar to Figure 4 showing the pull pawl engaging its ratchet and the push pawl out of engagement; Figure 4 is a view similar to Figures 2 and 3 showing both pawls in engagement with their ratchets; Figure 5 is a view taken along line 5—5 of Figure 1 showing the parts in the same position as in Figure 4 but looking from the opposite direction and showing more particularly the push pawl in engagement with its ratchet; Figure 6 is a transverse section taken along line 6—6 of Figure 5; Figure 7 is a section taken along line 7—7 of Figure 1; Figure 8 is a section taken along line 8—8 of Figure 1; Figure 9 is a section through the gear end of the reel taken along line 9—9 of Figure 7 and showing the parts moved 90° from the position shown in Figure 1; Figure 10 is a section taken along line 10—10 of Figure 1 illustrating my improved means for locking the spool sleeve to the frame of the reel while manipulating the clutch; Figure 11 is a section along line 11—11 of Figure 1; Figure 12 is a section taken along line 12—12 of Figure 1, and Figure 13 is a section along line 13—13 of Figure 1.

The reel illustrated in these drawings and forming part of the present invention, comprises a pair of fixed end plates, the gear end plate 1 and the clutch end plate 2 which are connected by pillars 3 forming a frame which is supported upon the pole by means of a foot plate 4 (the tip of the pole would point toward the top of the sheet in Figure 1). Extending axially through the reel is a spindle or rod 5 carrying at its right hand end a gear crank 6, and at its left hand end a clutch crank 7. These two cranks carry between them at their outer ends a transverse handle 8 by the oscillation of which the spool of the reel is rotated. This handle comprises a sleeve 10 to which the ends of the cranks 6 and 7 are rigidly connected by nuts 12 and on which a handle grip 11 is rotatably mounted. Extending through the bore of the sleeve 10 and rotatable therein is a rod 9 the function of which will become clear presently. The spindle 5 which connects the inner ends of the two cranks 6 and 7 extends through the bore of a sleeve 13. The spool 14 is journaled upon this sleeve 13 and is freely rotatable thereon when the line is running free, but is clutched to it during reeling in by a clutch which I shall describe later on.

The foregoing is, in general, a description of the reel of my copending application. I shall now describe the double-acting pawl and ratchet mechanism of the present invention whereby both swinging movements of the handle are translated into rotation of the sleeve 13 and hence of the spool 14 when the latter is clutched to the former.

Rotatably mounted at the right hand end of the rod 5 is a collar 15 (Figure 9) upon which is threadedly mounted, by means of left-hand threads, a ratchet 16. This is the pull ratchet and operates to rotate the sleeve 13 through mechanism which I shall now describe. Integral with the collar 15 is an annular flange 17 which carries a plate 18 on which are mounted two planetary gears 19. These planetary gears mesh with an annular rack 20 and with a pinion 21 mounted upon the right hand end of the sleeve 13. Assuming the annular rack 20 to be fixed relative to the frame of the reel, as it is in the reel of my copending application, rotation of pull ratchet 16 and parts rigidly associated with it causes the planetary gears to revolve about the axis of the reel, and as they revolve they rotate and so rotate the pinion 21 and the sleeve 13. This rotation, however, takes place only when the ratchet 16 is operated on the pull stroke. On the push stroke the ratchet 16 would be stationary and no power would be applied to rotate the sleeve. I have, therefore, provided a push ratchet which, operating through associated mechanism continues the rotation of the sleeve on the outward stroke of the handle. I shall now describe this push ratchet and its operation.

Rotatably mounted upon the collar 15 is a ratchet collar 22 (see Figure 1) which is provided on its periphery with ratchet teeth pointing in the opposite direction from those of ratchet 16. Integral with this ratchet collar 22 is a plate 23 which lies within the outer housing of the end plate 1 and is provided at its periphery with an annular flange 24 which carries interiorly the annular rack 20 and exteriorly a ratchet 25 which has associated therewith a pawl 26 mounted on the end plate 1. Returning for a moment to the collar 15 and its associated elements, and referring particularly to Figure 9, it will be seen that the flange 17 extending beyond the plate 18 is provided with a ratchet 27 which has associated with it a pawl 28 (see Figure 1) mounted on the inner face of the inner housing of the end plate 1. When the push ratchet 22 is rotated carrying with it the annular rack 20, the planetary gears 19 are rotated and through them pinion 21 and sleeve 13, the ratchet 27 and pawl 28 preventing the plate 18 which carries the planetary gears from rotating and carrying them with it. Thus the sleeve 13 is rotated, and always in the same direction, when either the pull ratchet 16 or the push ratchet 22 is rotated. I shall now describe the pawls which actuate these ratchets, with particular reference to Figures 2, 3, 4, 5 and 6.

Mounted within the crank arm 6 adjacent the ratchets 16 and 22 is a guide 29 in which the push pawl 30 is slidably mounted, as shown most clearly in Figure 5, this pawl terminating in two teeth. The push pawl is made in the form of a channel, as shown most clearly in Figure 6, and within it the pull pawl 31 is slidably mounted, the pull pawl terminating in a single tooth, as shown in Figures 2, 3 and 4. The outer end of the pull pawl 31 is connected by means of a link 32 having a slot 32' to a bell crank 33 mounted upon a squared end of the handle rod 9 and provided on its longer arm with a thumb key 34. The pawls are urged into ratchet-engaging position by means of tension springs 35 and 36, the latter being attached to a pin 37 on the pull pawl which extends through a slot 38 in the push pawl. The pull pawl is retracted by means of inward or downward pressure of the thumb upon the key 34 and carries with it the push pawl through engagement of the pin 37 with the outer margin of the slot 38. A frictionally held pivoted lever 39 extending into a slot 40 in the push pawl, when normal to the crank arm, as shown in Figures 2 and 3, prevents inward movement of the push pawl under impulsion of spring 35 and so holds the push pawl out of engagement with its ratchet, but when lever 39 is thrown over toward the handle, as shown in Figures 4 and 5, the spring 35 is free to move the pawl into ratchet engagement. Thus when the lever 39 is normal only the pull ratchet can be operated; when inclined both ratchets can be operated.

I shall now describe the double-ratcheting operation with both pawls 30 and 31 in engagement with their respective ratchets 22 and 16. The pull stroke of the handle, the stroke toward the butt end or foot of the pole, rotates the ratchet 16 and with it the planetary gears which, meshing with the pinion 21, rotate the sleeve 13. During this movement the pawl 26 holds the annular rack 20 against rotation. Upon the return or push stroke, toward the tip of the pole, the ratchet 22 is rotated and with it the plate 23 and the annular rack 20 which rotates the planetary gears and hence the sleeve 13. The pawl 28 prevents revolution of the rotating planetary gears and so transmits the rotary movement of the annular rack 20 to the pinion 21.

Rotation of the sleeve 13 is transmitted to the spool 14 through a clutch which I shall now describe. The sleeve 13 is provided near its left hand end with four equi-spaced radial ribs 42 (see Figures 11 and 12) upon which are mounted three clutch discs, a bronze clutch disc 43, a fibre clutch disc 44 and a combination bronze clutch disc and ratchet 45. Discs 43 and 45 are provided with radial notches which receive the radial ribs 42 on the sleeve 13 so that these two discs rotate with the sleeve but may have an axial movement relative thereto. The central aperture of the intermediate fibre disc 44, however, is of sufficient diameter to slip over the rib end of the sleeve 13 and is not provided with notches for engaging those ribs. The fibre disc 44, therefore, has no direct connection with the sleeve 13. Integral with the lefthand end of the spool 14 and forming a part thereof is a click drum 46 (co-operating with the usual click tongue 41) having a peripheral flange 47 which overlies the perimeter of the disc 43 and is provided with projections 48 which extend into notches in the periphery of the disc 44. The fibre disc 44 is thus rotatable with the click drum and the spool but may have axial movement relative thereto. Mounted on the end plate 2 is a hold-back pawl 49 which engages ratchet teeth 50 on the periphery of the disc 45.

It will be clear from the foregoing that if the clutch discs 43, 44 and 45 are mounted loosely relative to one another rotation of the sleeve 13 will not be transmitted to the spool 14 and the spool can rotate on the sleeve 13 as a journal. On the other hand, if pressure is exerted to force these three discs into frictional engagement rotation of the sleeve will be transmitted through disc 45 and disc 44 and click drum 46 to the spool, causing the latter to rotate with the sleeve, and the spool cannot rotate on its journal. It can, however, be reversely rotated by the pull of the fish when that pull exceeds the frictional resistance between the clutch discs.

The clutch, as above described, is substantially the same as that illustrated in my copending application. I shall now describe the improved means which I have provided for operating this clutch. Mounted on the left hand end of the sleeve 13 is a collar 51 slidable axially with reference to the sleeve, but rotated with it through a screw 52, the head of which lies within a keyway 53 in the collar. This collar 51 abuts at its inner end against the clutch disc 45, and so by moving the collar inward the clutch discs can be brought into frictional engagement. This axial movement of the collar 51 is effected by means of an adjusting nut 54 threadedly mounted by means of left hand threads on the end of the sleeve 13. Thus nut 54 is turned by means of a double-acting pawl 55 (see Figure 13) mounted upon the crank arm 7 and engaging similar double-acting ratchet teeth 56 on the periphery of the nut 54. This pawl is moved into and out of engagement with the teeth 56 by means of a thumb key 57 mounted on a squared end of the handle rod 9 and connected to the pawl through a connecting link 58. The pawl 55 is normally held in retracted or inoperative position by means of an expansion spring 59.

It is necessary, of course, to hold the collar 51 and the sleeve 13 fixed relative to the end plate 2 in order to turn the adjusting nut 54 relative to the sleeve, and I do this by the following means: A collar 71 is fixed to the end plate 2 and provided with a series of pockets 60 extending, as indicated in Figure 10, over an arc determined by the amplitude of oscillation of the handle necessary for operation of the adjusting nut. In these pockets are located a series of steel balls 61. The collar 51 is provided with a flange 62 in the periphery of which are located a series of pockets 63 each shaped to receive one of the balls 60. Mounted to one side of and carried by the pawl 55 is an arcuate plate 64 which when the pawl is moved into engagement with the ratchet teeth 56 on the adjusting nut enters a continuous slot 65 in the collar 71 and moves two or more of the balls 61 into engagement with two or more of the pockets 63, thus locking the collar 51 and the sleeve 13 against rotation. As the crank 7 is swung to turn the adjusting nut 54 the plate 64 moves over the series of balls 61 but two or more of these balls are always held in interlocking engagement with the collar 51. Beveled corners on the plate 64 engage successive balls and move them into the pockets 63.

The pockets 60 are upset slightly around their inner ends to prevent the balls from dropping through. A cover 66 forming an extension of the crank 7 overlies the nut 54 and is provided with an inwardly extending annular flange 72 which enters a corresponding annular groove 73 in the collar 71 and prevents the balls 61 from dropping out of the pockets 60 after the parts are assembled. The collar 71 is so shaped beyond the pockets 60, that the balls cannot roll off before assembly as long as the collar is in substantially horizontal position. An opening 74 in this flange 72 permits the plate 64 to reach the balls and a second opening 75 permits the pawl 55 to engage the ratchet teeth 56.

In order to limit the outward travel of the nut 54 and thus prevent its jamming against the plate 66 I provide the outer face of the collar 51 with a stop pin 67, and the nut 54 with a screw 68 which carries a corresponding stop pin 69 which engages the stop pin 67 when the nut 54 has been moved outward to its predetermined limiting position. Should an attempt be made to swing the handle beyond the limiting position defined by these pins the pawl 55 will disengage the ratchet 56. As the clutch discs wear, it may be necessary from time to time to change the adjustment of these stops and for this purpose I have provided a plurality of screw holes 70 in the nut 54 into any one of which the screw 68 may be fitted.

The thumb keys 34 and 57 being both mounted upon squared ends of the handle rod 9 the pawls 30, 31 and 55 can be operated by either. Thus when the handle is grasped with the right hand the right thumb controls the reel through thumb key 57 while if the handle is grasped by the left, the left thumb effects the same control through the thumb key 34.

The method of operation of my improved reel which I have just described is not very different from that of the reel described in my copending application. To let the line out the spool 14 must be freely rotatable upon the sleeve 13 and we shall therefore assume that the adjusting nut 54 has been turned into clutch releasing position. The handle is swung toward the butt end of the pole and the line permitted to unwind. If the line is playing out too fast the fisherman presses on key 34 or 57 to move the pawl 55 into engagement with teeth 56 on the nut 54 and swings the handle toward the tip of the pole, thus gradually increasing the pressure between the clutch discs and applying a drag to the spool. Should he get a strike as the line is being played out he swings the handle toward the tip of the pole to place the clutch discs under the necessary pressure to permit reeling in, this pressure being determined by the strength of the line. Thus if the line will break at 50 lbs. pull the clutch is adjusted so that it will slip at, say, 40 lbs. counter-line pull and permit the fish to run out without breaking the line.

If, however, all of the line is paid out and there has been no strike the fisherman desires to reel his line in as rapidly as possible. In order to do this, pressure on the key 34 or 57 is released permitting expansion spring 59 to disengage the pawl 55 from the adjusting nut and permit springs 35 and 36 to move the pawls 30 and 31 into engagement with their ratchets, lever 39 being inclined as illustrated in Figures 4 and 5 to permit a free sliding movement of the push pawl 30. As the fisherman now oscillates the handle both the push and pull stroke are operating strokes and the line is rapidly reeled in.

If the fisherman gets a strike he throws the lever 39 into vertical position thus holding the push pawl out of engagement with its ratchet and reeling-in will take place only half as fast as when both ratchets are operated. A period of reeling-in will be alternated with a period of pumping in which the fisherman swings his pole up to take in several feet of line which is subsequently reeled in when the pole is lowered. During this pumping operation both hands can be effectively employed not only the hand grasping the pole, but the hand grasping the crank handle as well.

I claim:

1. In a fishing reel, a spool, means for mounting the spool on a pole, a swinging crank for rotating the spool, a transverse crank handle symmetrically mounted with respect to the pole for swinging the crank and acting as a hand hold for supporting the pole, and means for transforming both the inward and outward swinging movements of the handle into a unidirectional rotation of the spool.

2. In a fishing reel, a spool, a swinging crank for rotating the spool mounted to swing about the axis of the spool, and double-acting ratchet mechanism for transforming both the inward and outward swinging movements of the handle into a unidirectional rotating of the spool.

3. In a fishing reel, a spool, two ratchets through which the spool can be unidirectionally rotated, a crank mounted to swing about the axis of the spool and two pawls carried by the crank, one engaging each ratchet, one of said pawls being operative during the inward swinging movement of the crank and the other during the outward swinging movement thereof.

4. In a fishing reel, a spool, a swinging handle for rotating the spool, means for transforming both the inward and outward swinging movements of the handle into a unidirectional rotation of the spool, and means for rendering one of the swinging movements inoperative to rotate the spool.

5. In a fishing reel, a spool, two ratchets through which the spool can be unidirectionally rotated, a swinging crank, two pawls carried by the crank, one engaging each ratchet, one of said pawls being operative during the inward swinging movement of the crank and the other during the outward swinging movement, and means operable at the will of the fisherman for throwing one of said pawls only out of engagement with its ratchet so that the spool is positively rotated during only one of the swinging movements of the crank.

6. In a fishing reel, a spool, means for mounting the spool on a pole, two ratchets through which the spool can be unidirectionally rotated, a crank swinging about the axis of the spool having a handle extending across the pole, two pawls carried by the crank, one engaging each ratchet, one of said pawls being operative during the pull stroke of the handle and the other during the push stroke, and means, operable at the will of the fisherman, for holding the push pawl only out of engagement with its ratchet so that only the pull stroke is effective to rotate the spool.

7. In a fishing reel, a spool, two ratchets through which the spool can be unidirectionally rotated, a swinging crank, two pawls carried by the crank, one engaging each ratchet, one of said pawls being operative during the inward swinging movement of the crank and the other during the outward swinging movement, springs urging the two pawls into engagement with the ratchets, means on the handle for retracting one of the pawls and means carried by that pawl for retracting the other.

8. In a fishing reel, a frame, a spool rotatable therein, a pinion rotatable with the spool, planetary gears meshing with the pinion, a rotatable carrier for the planetary gears, an annular rack meshing with the planetary gears, a rotatable carrier for the rack, a pawl carried by the frame preventing revolution of the planetary gears in one direction, a second pawl carried by the frame preventing rotation of the annular rack in the opposite direction, a ratchet connected to each of the carriers for the planetary gears and the rack, an oscillating crank, two pawls carried by the crank, one engaging the planetary gear ratchet and the other the annular rack ratchet, one pawl only being operative during each stroke of the crank, whereby as the crank is oscillated first the planetary gears are revolved and rotated by meshing with the fixed rack to rotate the spool pinion and then the rack is rotated and by meshing with the non-revolving planetary gears causes them to rotate the spool pinion in the same direction as before.

9. In a fishing reel, a spool, a journal on which the spool is mounted, two ratchets through which the journal can be unidirectionally rotated, a swinging crank for rotating the journal, two pawls carried by the crank, one engaging each ratchet, one of said pawls being operative during the inward swinging movement of the crank, and the other during the outward swinging movement thereof, a friction clutch for clutching the spool to the journal, a nut on the journal for controlling the pressure between the clutch elements, a second swinging crank for turning the nut, a pawl carried by the second crank for engaging the nut, a transverse handle connecting the two cranks, a rotatable rod carried by the handle, connections between the rod and the pawls so arranged that as the rod is turned to move the nut pawl into engagement with the nut the two journal rotating pawls are moved out of engagement with their ratchets, and means on the end of the rod for turning it.

10. In a fishing reel, a frame, means for mounting the frame on a pole, a journal rotatably mounted in the frame, a spool mounted for rotating on the journal, a clutch disc rotatable with the journal, a clutch disc rotatable with the spool, means for rotating the journal, a clutch-adjusting nut on the journal, a crank for turning the nut, means for transmitting the pressure of the nut to the clutch discs, means for locking the journal to the frame to prevent rotation while the adjusting nut is being turned, said locking means comprising a series of balls mounted in the frame and held against appreciable bodily movement circumferentially relative thereto, means rotatable with the journal and provided with pockets and means for moving some of the balls into some of the pockets.

11. In a fishing reel, a frame, means for mounting the frame on a pole, a journal rotatably mounted in the frame, a spool mounted for rotation on the journal, a clutch disc rotatable with the journal, a clutch disc rotatable with the spool, means for rotating the journal, a clutch-adjusting nut on the journal, a collar slidably mounted on the journal but rotatable therewith for transmitting the pressure of the nut to the clutch discs and provided with pockets in its periphery, a crank for turning the nut, a pawl carried by the crank for engaging the nut, a series of balls mounted in the frame and held against appreciable bodily movement circumferentially relative thereto, and means carried by the pawl for moving some of the balls into some of the pockets to lock the journal relative to the frame while the clutch adjusting nut is being turned.

HYLA F. MAYNES.